United States Patent
Mehta

(10) Patent No.: US 8,857,154 B2
(45) Date of Patent: Oct. 14, 2014

(54) EXHAUST AFTERTREATMENT FOR NOX-CONTAINING EXHAUST FROM AN INTERNAL COMBUSTION ENGINE

(75) Inventor: Darius Mehta, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 326 days.

(21) Appl. No.: 13/356,258

(22) Filed: Jan. 23, 2012

(65) Prior Publication Data
US 2013/0186064 A1    Jul. 25, 2013

(51) Int. Cl.
*F01N 3/00* (2006.01)

(52) U.S. Cl.
USPC .......................................................... 60/274

(58) Field of Classification Search
CPC ....... F01N 3/0871; F01N 3/106; F01N 3/208; F01N 3/035; F01N 9/00; F02D 41/0275
USPC .......................................................... 60/274
See application file for complete search history.

(56) References Cited

U.S. PATENT DOCUMENTS

| | | | | |
|---|---|---|---|---|
| 7,640,730 B2* | 1/2010 | Gandhi et al. | ................ | 60/297 |
| 7,650,746 B2* | 1/2010 | Hu et al. | ................ | 60/286 |
| 2005/0005597 A1* | 1/2005 | Bruck | ................ | 60/297 |
| 2005/0028518 A1* | 2/2005 | Li et al. | ................ | 60/300 |
| 2006/0010859 A1* | 1/2006 | Yan et al. | ................ | 60/286 |
| 2007/0012032 A1* | 1/2007 | Hu | ................ | 60/286 |
| 2007/0056268 A1* | 3/2007 | McCarthy, Jr. | ................ | 60/286 |
| 2007/0277507 A1* | 12/2007 | Yan | ................ | 60/286 |
| 2008/0256932 A1* | 10/2008 | Duvinage et al. | ................ | 60/286 |
| 2008/0314020 A1* | 12/2008 | Hoard et al. | ................ | 60/274 |
| 2009/0173064 A1* | 7/2009 | Ren et al. | ................ | 60/299 |
| 2010/0077734 A1* | 4/2010 | Shamis et al. | ................ | 60/286 |
| 2010/0236224 A1* | 9/2010 | Kumar et al. | ................ | 60/297 |
| 2010/0242448 A1* | 9/2010 | Mital | ................ | 60/286 |
| 2010/0319320 A1* | 12/2010 | Mital et al. | ................ | 60/285 |
| 2010/0326054 A1* | 12/2010 | Kato | ................ | 60/280 |
| 2011/0011060 A1* | 1/2011 | McCarthy, Jr. | ................ | 60/274 |
| 2011/0023480 A1* | 2/2011 | Chyo | ................ | 60/602 |
| 2011/0138777 A1* | 6/2011 | Jen et al. | ................ | 60/274 |
| 2011/0173950 A1* | 7/2011 | Wan et al. | ................ | 60/274 |
| 2011/0185708 A1* | 8/2011 | McCarthy et al. | ................ | 60/286 |
| 2011/0252766 A1* | 10/2011 | Ramanathan et al. | ................ | 60/274 |

* cited by examiner

*Primary Examiner* — Thomas Denion
*Assistant Examiner* — Jason Shanske
(74) *Attorney, Agent, or Firm* — Chowdhury & Georgakis PC; Ann C. Livingston

(57) ABSTRACT

A method of treating NOx-containing exhaust from an internal combustion engine. An exhaust aftertreatment system has the following devices arranged in the following order downstream the exhaust manifold: a lean NOx trap (LNT), a particulate filter (PF) and a selective reduction catalyst (SCR) device. At least the LNT is located in the engine compartment. The SCR temperature at the input to, or in, the SCR is monitored to determine whether the aftertreatment system is to be operated in a cold mode or warm mode. Only during warm mode is reductant provided to the SCR, and during warm mode the LNT is not regenerated.

11 Claims, 2 Drawing Sheets

EXHAUST AFTERTREATMENT FOR NOX-CONTAINING EXHAUST FROM AN INTERNAL COMBUSTION ENGINE

TECHNICAL FIELD OF THE INVENTION

This invention relates to exhaust aftertreatment of exhaust from internal combustion engines, and more particularly to aftertreatment of NOx-containing exhaust such as exhaust from a lean burn engine.

BACKGROUND OF THE INVENTION

Despite new technologies that significantly aid in reducing exhaust emissions from internal combustion diesel engines, NOx and particulate emissions are still a subject of environmental concern. Diesel emission standards for vehicle engines are becoming increasingly stringent, and it is difficult to meet governmental emissions regulations by merely relying only on improvements to the diesel engine itself. Thus, diesel engines continue to require some sort of diesel exhaust gas aftertreatment system.

Various exhaust aftertreatment devices have played an essential role in engine emission technologies. Diesel particulate filters (DPF's) are used for particulate matter (PM) control, and lean NOx traps (LNT's) are used for nitrogen oxides (NOx) control. In addition to diesel applications, DPF's and LNT's can be used with lean burn gasoline engines.

Under lean conditions, an LNT adsorbs NOx produced from engine combustion. The adsorption process generally involves two steps. First, engine-out nitric oxide (NO) reacts with oxygen to form nitrogen dioxide (NO2) on an active oxidation catalyst (such as platinum). Second, the NO2 is adsorbed in the form of nitrates by a storage material (such as barium oxide). The LNT may be regenerated under certain conditions, whereby NOx is released and reduced to N2.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to various embodiments of an automotive exhaust aftertreatment system for reducing NOx and PM emissions. The system is especially suitable for diesel engines, but may also be suited for lean burn gasoline engines or any other engine that produces NOx and PM in its exhaust.

A feature of the invention is the recognition that passive DPF regeneration is preferable to active regeneration. Regeneration is the process of removing the accumulated soot from the DPF. Passive regeneration is performed passively by using the engine's exhaust heat in normal operation or by adding a catalyst to the filter. Passive regeneration requires no fuel penalty to oxidize stored soot. Active regeneration requires the introduction of very high heat into the exhaust system, and typically has a fuel and CO2 penalty.

Figure 1:
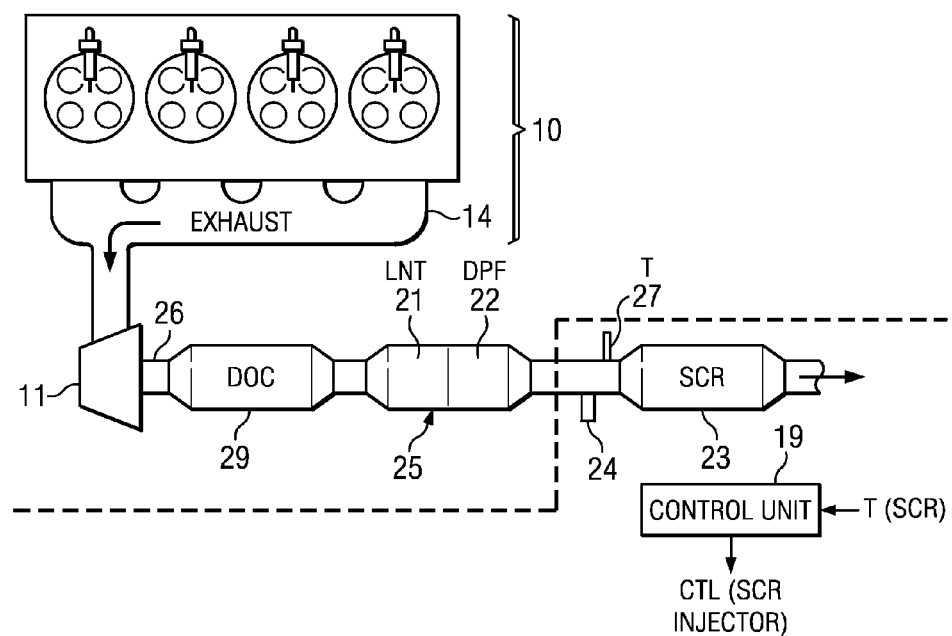
FIG. 1 illustrates an exhaust aftertreatment system having an LNT, DPF and SCR.

FIG. 1 illustrates an engine 10, whose exhaust is delivered to an exhaust aftertreatment system in accordance with the invention. In the illustrative embodiment, engine 10 is a diesel engine of an automotive type vehicle, and is an air-boosted engine having a turbocharger. The engine's intake air is compressed by the turbocharger's compressor, which is mechanically driven by its turbine 11. Exhaust gas is discharged from the engine's exhaust manifold 14.

The exhaust aftertreatment system comprises a lean NOx trap (LNT) 21, a diesel particulate filter (DPF) 22 and a selective catalytic reduction (SCR) device 23. Although it may be possible for LNT 21 to provide oxidation, in many cases it may also be desirable to include a diesel oxidation catalyst (DOC) 29 ahead of the LNT. As explained below, the aftertreatment system allows both rapid NOx emissions control upon engine start-up and passive DPF regeneration.

LNT 21 is located in the engine compartment, with separation between the engine compartment and under floor of the vehicle being indicated by dashed lines. DPF 22 may be conjoined with LNT 21 as shown, or under floor. SCR is installed in-line on an under-floor exhaust line. The treated exhaust exits the SCR device 23 into the atmosphere via the vehicle's tailpipe. Each of the aftertreatment devices, LNT 21, DPF 22 and SCR 23, may be any one of commercially available products, known or to be developed.

LNT 21 (also sometimes referred to as a NOx adsorber) is used to reduce oxides of nitrogen (NO and NO2) emissions from a lean burn (i.e., oxygen rich) internal combustion engine. LNT's are a rapidly developing technology, but in general, they operate by catalytically oxidizing NO to NO2. The NO2 is stored in a trapping site (storage media) as a nitrate. When this storage media nears capacity, it must be regenerated. This is accomplished during a brief NOx regeneration process, as explained below.

LNT 21 is closely coupled to the engine. By "closely coupled" is meant that LNT 21 is located in the engine compartment, typically near a major heat-producing element so that it may quickly be heated as the engine warms up. Unlike conventional LNTs, which must be sized and formulated to provide NOx control over the engine's entire range of temperatures and loads, for the reasons explained below, LNT 21 can be smaller and formulated for lower temperature NOx conversion, i.e., cold start and light loads. Furthermore, unlike LNTs that trap NOx at low temperature and release NOx at a higher temperature based on the LNT chemistry, LNT 21 releases and converts NOx when control unit 19 determines that a regeneration event is to occur.

In the embodiment of FIG. 1, DPF 22 is conjoined with LNT 21, in the sense that exhaust passes directly and immediately from the LNT 21 into the DPF 22. Because they are conjoined, DPF 22 and LNT 21 may be contained in the same outer housing 25, which may share the same fittings to the exhaust line. In other embodiments, DPF 22 may be a separate device from LNT 21 and may be under-floor instead of in the engine compartment.

DPF 22 treats exhaust emissions, and in particular, PM emissions in the exhaust. The term "diesel particulate filter" as used herein is not limited to filters used for diesel engines, and may include various types of particulate filters. Typically, DPF 22 is catalyzed, which permits DPF 22 to passively regenerate. The regeneration results from chemical reaction of the DPF catalyst, which raises the temperature within the DPF 22 high enough to oxidize PM collected in the DPF 22.

An example of a suitable DPF 22 is a ceramic wall flow filter with a platinum catalyst coating on the filter walls.

Additional or other catalyst formulations may be used, such as rhodium, for NO to NO2 reduction.

SCR 23 is a device that uses a catalyst to convert NOx into nitrogen and water. A reductant, such as anhydrous ammonia, aqueous ammonia or urea, is added to the exhaust gas to activate the catalyst. An injector 24 is used to introduce the reductant into the SCR 23. Carbon dioxide, CO2, is a reaction product when urea is used as the reductant.

SCR 23 may be manufactured from various ceramic materials used as a carrier, such as titanium oxide. The catalytic components are usually oxides of base metals (such as vanadium and tungsten), zeolites, or various precious metals. As explained below, SCR 23 is sized, formulated and positioned to control NOx at warm temperatures using urea.

Control unit 19 may be processor-based, programmed to control various aspects of engine operation. In general, control unit 19 may be implemented with various controller devices known or to be developed. Further, control unit 19 may be part of a more comprehensive engine control unit that controls various other engine and/or emissions devices.

Control unit 19 is programmed to receive input signals and provide control signals, to implement the method described below. In particular, control unit 19 receives a measurement signal representing the temperature at or in SCR 23. It delivers control signals to the SCR injector 24, and in some embodiments, to a heater or other device (not shown) for active regeneration of LNT 21.

In operation, NOx control is achieved using two distinct modes of operation: cold mode and warm mode. These modes are differentiated by the SCR temperature. More specifically, the NOx control method depends on whether the SCR 23 is cold or warm. A temperature sensor 27 may be placed at the inlet to SCR 23, to measure inlet temperature as a gas temperature measurement. Alternatively, the temperature sensor 27 may be located to measure temperature in the SCR bed, such as halfway into SCR device 23.

The exhaust aftertreatment system is operated in "cold mode" if the SCR 23 is cold. Cold mode will begin at engine start-up. During the cold mode, LNT 21 is used to provide NOx control. Because LNT 21 is near the turbine 11 of the turbocharger, it will be heated rapidly.

During cold mode, SCR 23 is warming up but is not providing NOx control. The warm-up time for SCR 23 depends on the mass and other physical properties of the engine and aftertreatment system. The warm-up time may be as long as several minutes.

"Warm mode" occurs when SCR 23 becomes warm. In warm mode, SCR 23 is used as the NOx control device. As indicated above, this is accomplished by injecting a reductant into the SCR 23. The temperature at which the SCR 23 is considered "warm" is when it is sufficiently warm to provide adequate NOx control, i.e., NOx reduction from the tailpipe exhaust that at least meets regulatory requirements. For today's engines and aftertreatment systems, this is typically 180 to 200 degrees Centigrade.

During warm mode, from the time when SCR 23 begins to provide NOx treatment, no active LNT regeneration events for LNT 21 are performed. Without regeneration events, LNT 21 will eventually become filled and will no longer store NOx. The NOx will pass through the LNT 22 and into DPF 22, which provides a means of passive DPF regeneration via the NO2—soot regeneration path. Specifically, during this "warm mode", DPF regeneration continuously oxidizes the soot trapped in the DPF 22.

Active regeneration of LNT 21 may be used during cold mode. DPF 22 is a heat sink and if it takes sufficient time for the SCR 23 to warm up and trigger warm mode, the LNT 21 may reach a sufficiently high temperature to allow active regeneration. For example, if LNT 21 reaches a temperature of 250 C or more before SCR 23 triggers warm mode, active regeneration of LNT 21 may be performed. The threshold SCR temperature for entering warm mode may be set sufficiently high so that at least one LNT regeneration event will occur.

A third mode is a "key-off" mode, in which LNT 21 is actively regenerated when the engine 10 recieves a command to be turned off. This results in emptying the LNT 21 and providing maximum NOx emissions treatment when the engine is again started. Various known monitoring strategies may be used to determine if LNT regeneration is needed.

For conventional engines, a "key-off" command to an engine (or other shut off procedure) will cut fuel to the engine and cause the engine to stop. However, for purposes of the method described herein, in the "key-off" mode, a key-off command is followed by an LNT regeneration command. After LNT regeneration, fuel is cut. In one embodiment, regeneration is performed with post-injection while throttling to provide rich exhaust gas. Referring again to FIG. 1, for active LNT regeneration, control unit 19 may be programmed to deliver appropriate control signals to heating units, fuel injectors, throttling devices, etc., and as otherwise may be required to cut the engine after regeneration.

Figure 2:
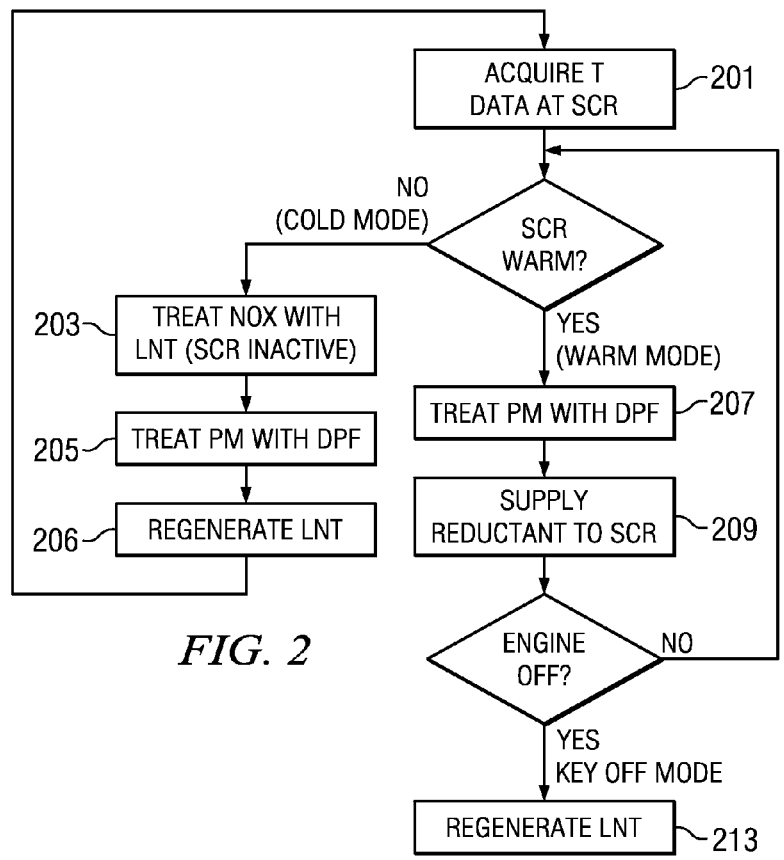
FIG. 2 illustrates a method of treating exhaust using an LNT, DPF, and SCR.

FIG. 2 illustrates the above-described method. In Step 201, the temperature at or in the SCR is measured. If it is below a predetermined threshold, the aftertreatment system is operated in cold mode. In Steps 203 and 205 respectively, NOx is treated with an LNT and PM is treated with a DPF. In Step 206, the LNT is regenerated, which may occur passively or be performed actively as needed.

The SCR temperature is continuously or repeatedly monitored to determine whether it has reached the threshold. If the SCR temperature is at or above the threshold, the aftertreatment system is operated in warm mode. In Steps 207 and 209 respectively, PM is treated with the DPF and NOx is treated with an SCR. During warm mode, the SCR is "activated" by supplying it with a reductant. Warm mode continues until the engine receives a command to be shut off. Upon the engine receiving a command to be shut off, an optional key-off mode with LNT regeneration may be performed.

Figure 3:
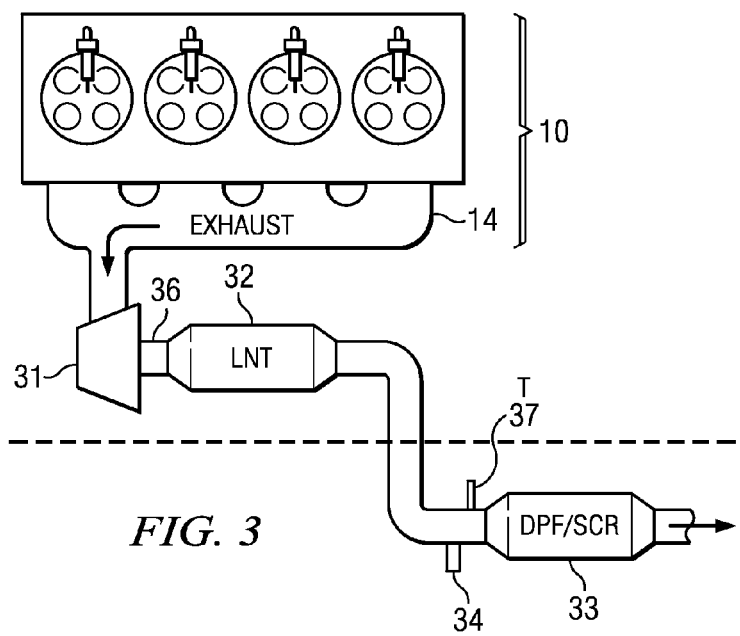
FIG. 3 illustrates an alternative embodiment of an exhaust aftertreatment system having an LNT, DPF and SCR.

FIG. 3 illustrates a second embodiment of the aftertreatment system. LNT 32 is closely coupled to the engine, as described above. DPF 33 has a catalytic coating that allows it to function as an SCR, and is thus labeled as DPF/SCR 33.

In the embodiment of FIG. 3, the dashed lines indicate the engine compartment versus under-floor locations. DPF/SCR 33 is located under floor, but it may also be located in the engine compartment. A temperature sensor 37 and reductant injector 34 are used in the manner described above. Operation of the aftertreatment system of FIG. 3 is the same as for the system of FIG. 1, and as described above in connection with FIGS. 1 and 2. As in the embodiment of FIG. 1, an oxidation catalyst may be provided upstream LNT 32.

What is claimed is:
1. A method of treating NOx-containing exhaust from an internal combustion engine, the engine having an exhaust manifold, the method comprising:
providing an exhaust aftertreatment system having the following devices arranged in the following order downstream the exhaust manifold: a lean NOx trap (LNT), a particulate filter (PF) and a selective reduction catalyst (SCR) device;
wherein at least the LNT is located in the engine compartment such that it is heated by the engine and is formu- lated to oxidize NO to NO2 as the engine warms up immediately after cold start without the aid of a reductant;

monitoring the SCR temperature at the input to, or in, the SCR;

comparing the SCR temperature to a predetermined threshold to determine whether the aftertreatment system is to be operated in a cold mode or warm mode;

providing reductant to the SCR only in warm mode;

accumulating NOx in the LNT during warm mode; and determining whether a command has been sent to turn off the engine, and if so, actively regenerating the LNT;

wherein active regeneration is performed by the engine remaining in operation by receiving fuel and with throttling to provide rich exhaust gas.

2. The method of claim 1, wherein the PF is conjoined with the LNT.

3. The method of claim 1, wherein the PF is catalyzed.

4. The method of claim 1, wherein the SCR is located under-floor.

5. The method of claim 1, further comprising providing an oxidation catalyst upstream of the LNT.

6. The method of claim 1, wherein the LNT is located proximate to the turbine of a turbocharger.

7. The method of claim 1, wherein the SCR is configured to use urea as a reductant.

8. The method of claim 1, wherein the PF and the SCR are implemented as an SCR-catalyzed particulate filter.

9. The method of claim 8, wherein the SCR-catalyzed particulate filter is located in the engine compartment.

10. The method of claim 8, wherein the SCR-catalyzed particulate filter is located outside the engine compartment.

11. The method of claim 1, further comprising performing at least one active regeneration process on the LNT during the cold mode.

* * * * *